(12) United States Patent
Posa

(10) Patent No.: US 9,942,375 B2
(45) Date of Patent: *Apr. 10, 2018

(54) PORTABLE ELECTRONIC DEVICES WITH INTEGRATED IMAGE/VIDEO COMPOSITING

(71) Applicant: Apple Inc., Cupertino, CA (US)

(72) Inventor: John G. Posa, Ann Arbor, MI (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,071

(22) Filed: May 23, 2016

(65) Prior Publication Data

US 2016/0269526 A1    Sep. 15, 2016

Related U.S. Application Data

(63) Continuation of application No. 14/467,687, filed on Aug. 25, 2014, now Pat. No. 9,350,924.

(51) Int. Cl.
*H04M 1/725* (2006.01)
*H04N 5/272* (2006.01)
(Continued)

(52) U.S. Cl.
CPC ....... *H04M 1/725* (2013.01); *H04M 1/72522* (2013.01); *H04N 1/00307* (2013.01);
(Continued)

(58) Field of Classification Search
CPC ............. H04N 5/3745; H04N 5/23212; H04N 5/3696; H01L 27/14621; H01L 27/14623;
(Continued)

(56) References Cited

U.S. PATENT DOCUMENTS

| 4,625,231 A | 11/1986 | Vlahos |
| 5,032,901 A | 7/1991 | Vlahos |

(Continued)

FOREIGN PATENT DOCUMENTS

| EP | 1858255 A1 | 11/2007 |
| EP | 1862971 A2 | 12/2007 |

(Continued)

OTHER PUBLICATIONS

Chang, Y. et al., A Bayesian Approach to Digital Matting, Dept. of Computer Science and Engineering, Univ. of Washington (date unknown).

(Continued)

*Primary Examiner* — Tuan Ho
(74) *Attorney, Agent, or Firm* — Blank Rome LLP

(57) ABSTRACT

Digital imagery is composed or composited within a smartphone or other portable electronic device to merge foreground and background subject matter acquired simultaneously with different cameras or acquired at different times with the same camera. A processor stores the digital imagery along with information derived or used by an operation to differentiate the foreground subject matter from the background scene, which may be a digital matting operation, and/or may involve finding an edge or an outline of the foreground subject matter. The foreground subject matter and the background scene may be stored as different graphical layers in the memory. A user control such as a touchscreen may enable a user to select and resize or reposition the foreground subject matter on a background scene of a separately acquired image. The digital imagery may constitute a still image or a sequence of images representative of motion video.

24 Claims, 8 Drawing Sheets

(51) Int. Cl.
*H04N 5/232* (2006.01)
*H04N 5/262* (2006.01)
*H04N 1/21* (2006.01)
*H04N 1/00* (2006.01)
*H04N 5/225* (2006.01)
*H04N 5/247* (2006.01)
*H04M 1/02* (2006.01)

(52) U.S. Cl.
CPC ......... *H04N 1/2112* (2013.01); *H04N 1/2125* (2013.01); *H04N 5/2257* (2013.01); *H04N 5/23216* (2013.01); *H04N 5/247* (2013.01); *H04N 5/2621* (2013.01); *H04N 5/272* (2013.01); *H04M 1/0264* (2013.01); *H04M 2250/22* (2013.01); *H04M 2250/52* (2013.01)

(58) Field of Classification Search
CPC ........... H01L 27/14627; H01L 27/1463; H01L 27/1464
See application file for complete search history.

(56) References Cited

U.S. PATENT DOCUMENTS

| | | | |
|---|---|---|---|
| 5,343,252 | A | 8/1994 | Dadourian |
| 5,424,781 | A | 6/1995 | Vlahos |
| 5,515,109 | A | 5/1996 | Vlahos et al. |
| 5,742,354 | A | 4/1998 | Vlahos et al. |
| 6,134,346 | A | 10/2000 | Berman et al. |
| 6,288,703 | B1 | 9/2001 | Berman et al. |
| 6,301,382 | B1 | 10/2001 | Smith et al. |
| 6,496,599 | B1 | 12/2002 | Pettigrew |
| 6,507,361 | B1 | 1/2003 | Barber |
| 6,525,741 | B1 | 2/2003 | Klassen et al. |
| 6,552,744 | B2 | 4/2003 | Chen |
| 6,553,140 | B1 | 4/2003 | Soupliotis et al. |
| 6,616,281 | B1 | 9/2003 | Vlahos et al. |
| 6,667,774 | B2 | 12/2003 | Berman et al. |
| 6,798,424 | B2 | 9/2004 | Nakamura |
| 6,839,463 | B1 | 1/2005 | Blake et al. |
| 6,885,767 | B1 | 4/2005 | Howell |
| 6,963,359 | B1 | 11/2005 | Aosaki et al. |
| 6,987,535 | B1 | 1/2006 | Matsugu et al. |
| 6,996,272 | B2 | 2/2006 | Chen et al. |
| 7,057,658 | B1 | 6/2006 | Shioji et al. |
| 7,091,993 | B1 | 8/2006 | Ahmad |
| 7,106,376 | B1 | 9/2006 | Anderson |
| 7,199,793 | B2 | 4/2007 | Oh et al. |
| 7,209,181 | B2 | 4/2007 | Kriegman |
| 7,221,778 | B2 | 5/2007 | Kondo et al. |
| 7,260,273 | B2 | 8/2007 | Sellers et al. |
| 7,340,106 | B2 | 3/2008 | Kondo et al. |
| 7,508,455 | B2 | 3/2009 | Liu et al. |
| 7,525,555 | B2 | 4/2009 | Berger et al. |
| 7,593,595 | B2 | 9/2009 | Heaney, Jr. et al. |
| 7,663,689 | B2 | 2/2010 | Marks |
| 7,697,776 | B2 | 4/2010 | Wu et al. |
| 7,725,355 | B2 * | 5/2010 | Mitani ............... G06Q 30/0601 345/619 |
| 7,835,571 | B2 | 11/2010 | Kaku |
| 7,874,917 | B2 | 1/2011 | Marks et al. |
| 8,072,470 | B2 | 1/2011 | Marks |
| 7,883,415 | B2 | 2/2011 | Larsen et al. |
| 8,142,288 | B2 | 3/2012 | Zalewskl |
| 8,368,753 | B2 | 2/2013 | Zalewski |
| 8,547,401 | B2 | 10/2013 | Mallinson et al. |
| 8,655,052 | B2 | 2/2014 | Spooner et al. |
| 8,686,939 | B2 | 4/2014 | Mao et al. |
| 8,744,184 | B2 | 6/2014 | Ameline et al. |
| 2005/0195294 | A1 | 9/2005 | Kim et al. |
| 2005/0212945 | A1 | 9/2005 | Shirakawa et al. |
| 2005/0219384 | A1 | 10/2005 | Herberger et al. |
| 2014/0176775 | A1 | 6/2014 | Ichikawa et al. |
| 2014/0267796 | A1 | 9/2014 | Jang et al. |

FOREIGN PATENT DOCUMENTS

| | | |
|---|---|---|
| WO | WO-2003041402 A1 | 5/2003 |
| WO | WO-2004015618 A1 | 2/2004 |
| WO | WO-2006096347 A2 | 9/2006 |

OTHER PUBLICATIONS

Gvili, R. et al., Depth Keying, 3DV Systems Ltd. (date unknown).
Li, S. et al., Multifocus image fusion using region segmentation and spatial frequency, *Image and Vision Computing*, 26: 971-79, 2008.
Wang, J. et al., image and Video Matting: A Survey, pp. 1-78 (date unknown).
Raman S., et al., "A Matte-less, Variational Approach to Automatic Scene Compositing," 2007.
Rother C., et al., "Grabcut: Interactive Foreground Extraction Using Iterated Graph Cuts," *ACM Transactions on Graphics (TOG)*, 23(3):309-314, ACM, 2004.

* cited by examiner

PORTABLE ELECTRONIC DEVICES WITH INTEGRATED IMAGE/VIDEO COMPOSITING

REFERENCE TO RELATED APPLICATION

This application is a continuation of U.S. patent application Ser. No. 14/467,687, filed Aug. 25, 2014, the entire content of which is incorporated herein by reference.

FIELD OF THE INVENTION

This invention relates generally to digital imaging and video and, in particular, to apparatus and methods wherein pictures or movies acquired at different times or simultaneously using different cameras in a mobile electronic device are composited, combined, superimposed or otherwise merged in the device itself.

BACKGROUND OF THE INVENTION

Image compositing involves mixing several video (or film) sources, which may be photographic or graphical, to form a single composite. Traditional movie "matting" is the process of compositing two different film elements by printing them, one at a time, onto a duplicate strip of film. After one component is printed on the duplicate, the film is re-wound and the other component is added. Since the film cannot be exposed twice without creating a double exposure, the blank second area must be masked while the first is printed; then the freshly exposed first area must be masked while the second area is printed. Each masking is performed by a "traveling matte"—a specially altered duplicate shot which lies on top of the copy film stock.

The most common technique used for live action matting is known as chroma key. Foreground objects are placed in front of a screen of a selected reference color, usually green or blue, and imaged. Chroma keying can be done with backgrounds of any color that are uniform and distinct, but green and blue backgrounds (i.e., "green screen" and "blue screen") are more commonly used because they differ most distinctly in hue from most human skin colors. The matte in this case is generated by color-based segmentation, which isolates the foreground objects from their background using the color as a data. This allows a new background to be substituted for the colored background. When chroma keying is used in video production and post-production, two images or video streams are overlaid based on color hues (chroma range).

Chroma keying has been widely used in various fields to remove a background from the subject of a photo or video—particularly in the news/weathercasting, motion picture and videogame industries. Commercially available computer software, such as Final Cut Pro, Pinnacle Studio, Adobe After Effects, and other programs now allow non-professionals to create videos with composited overlays using a chroma-key function and inexpensive green or blue screen kits.

The chroma-key technique has several disadvantages, however, one being the need for a special, uniformly colored background. Another problem is that if foreground objects contain colors similar to the color used for keying the background will show through. Further, using a single background color, the segmentation of the frame is limited to two layers only: a foreground layer, and (a colored) background layer that will be replaced completely by a new image; no further separation is possible between background and foreground objects.

Digital matting has replaced traditional, film-based approaches for several reasons. First, the required multiple strips of film may drift out of registration, resulting in halos and other undesirable edge artifacts. Digital matting is much more accurate, with precise alignment down to the pixel level in some cases. Digital images can be copied without quality loss, and multi-layer digital composites based upon 3-D models are readily generated.

With the proliferation of lightweight, handheld digital video cameras and smartphones with built-in cameras, users endeavor to take photographs of themselves in different environments. FIG. 1A is a drawing of a person 102 using a smart phone 104 with camera 106 to capture a self-shot. Holding the phone (or camera) at arm's length, the used can preview the image, including background features 108 on display screen 110. Once the desired composition is achieved, shutter button 112 is depressed or touched, and the image shown in FIG. 1B is captured. Among the problems with this approach is that all such "selfie" shots are similar in appearance, and may include a portion of the user's outstretched arm 114.

SUMMARY OF THE INVENTION

This invention resides in apparatus and methods whereby digital imagery is composed or composited within a smartphone or other portable electronic device to merge foreground and background subject matter acquired simultaneously with different cameras or acquired at different times with the same camera.

A mobile or portable electronic device constructed in accordance with the invention includes a camera operative to acquire a digital image in response to a user control, the digital image including foreground subject matter and a background scene. A processor within the portable electronic device is operative to receive the digital image acquired by the camera, and perform an operation on the digital image to differentiate the foreground subject matter from the background scene, thereby enabling the foreground subject matter to be manipulated separately from the background scene.

The processor is typically further operative to store the digital image in the memory along with information derived or used by the digital matting operation to differentiate the foreground subject matter from the background scene. The operation to differentiate the foreground subject matter from the background scene may be a digital matting operation, and the information derived or used by the digital matting operation may include a trimap. The operation to differentiate the foreground subject matter from the background scene may include finding an edge or an outline of the foreground subject matter, and the foreground subject matter and the background scene may be stored as different graphical layers in the memory.

In preferred embodiments, the user control may enables a user to select and resize or reposition the foreground subject matter on a background scene of a separately acquired image. The separately acquired image may be a previously acquired image retrieved from the memory, or the separately acquired image is acquired at the same time as the digital image using the second camera. The portable electronic device may include a display screen, in which case the digital image may be displayed on the display screen prior to, or following, the storage of the digital image.

Where the portable electronic device includes a user control in the form of a touchscreen display operative to display the digital image, the user is capable of performing various operations in conjunction with the processor. For example, the user may select the differentiated foreground subject matter of the digital image; retrieve a different digital image from the memory; and superimpose the foreground subject matter of the digital image onto the different digital image retrieved from the memory.

The portable electronic device may further include a second camera operative to acquire a second digital image including foreground subject matter and a background scene, in which case the processor is operative to automatically insert the foreground subject matter differentiated from the digital image into the background scene of the second digital image. The digital cameras may point in opposite directions. For example, one of the digital cameras may be a rear camera that points at the user during operation of the device, with the other digital camera being a front camera that points away from the user during operation of the device. In this configuration, the processor may be operative to automatically insert an image of the user taken by the rear camera (i.e., a "selfie") into a background scene taken by the front camera.

The mobile device may further include a display screen to display the composite image for acceptance by a user, in which case a user may perform various adjustments before or after the acceptance of the composite image. Such adjustments may include the zoom levels of one or both of the cameras, the size or position of the foreground subject matter relative to the background scene, or luminance or chrominance levels of the foreground subject matter relative to the background scene. The portable electronic device may be a smartphone including cellular telephone communications circuitry.

A method of composing a digital image in accordance with the invention includes the step of providing a portable electronic device including one or more digital cameras, a memory, a display and a processor. Background imagery and foreground imagery are acquired with at least one of the cameras of the portable electronic device. The method includes automatically generating composite imagery by combining the foreground and background imagery using the processor within the portable electronic device, and displaying the composite imagery on the display screen.

The method may include performing a matting operation on the foreground imagery to extract foreground subject matter from the foreground imagery, and performing a compositing operation by inserting the foreground subject matter into the background imagery. The method may further include generating and using an alpha mask to insert the foreground subject matter into the background imagery. As with other disclosed embodiments, all such processing steps are carried out entirely with the portable device itself using the processor or processors provided therein.

The portable electronic device may include a front-viewing camera and a rear-viewing camera, in which case the method may include the steps of using one of the cameras to acquire the background imagery, and using the other camera to acquire the foreground imagery. The front-viewing and rear-viewing cameras may acquire the background and foreground imagery simultaneously, or the same camera on the portable electronic device may be used to capture the background imagery and the foreground imagery at different times.

The method may include the steps of storing the background imagery and the foreground imagery in the memory, and retrieving the stored background imagery and the foreground imagery to generate the composite imagery. The composite imagery may also be stored in the memory, including the step of storing the background imagery and the foreground imagery as separate graphical layers in the memory.

The method may further include the steps of selecting particular subject matter in the foreground imagery, and generating the composite imagery by superimposing the selected subject matter onto the background imagery. Where the display is a touch-screen display, the method may include displaying the selected subject matter superimposed over the background imagery, and reducing, enlarging or repositioning the selected subject matter relative to the background imagery using the touch-screen display. Particular subject matter in the foreground imagery may be automatically selected based upon the distance of the particular subject matter from the portable electronic device. The distance may be based upon a predetermined value (such as the length of a user's arm), facial recognition, focus, depth of field, an optical transfer function, or spatial frequency. In all embodiments, digital image, digital imagery, composite imagery, and so forth, may comprise still photograph(s) and/or motion video.

DETAILED DESCRIPTION OF THE INVENTION

Figure 1A:
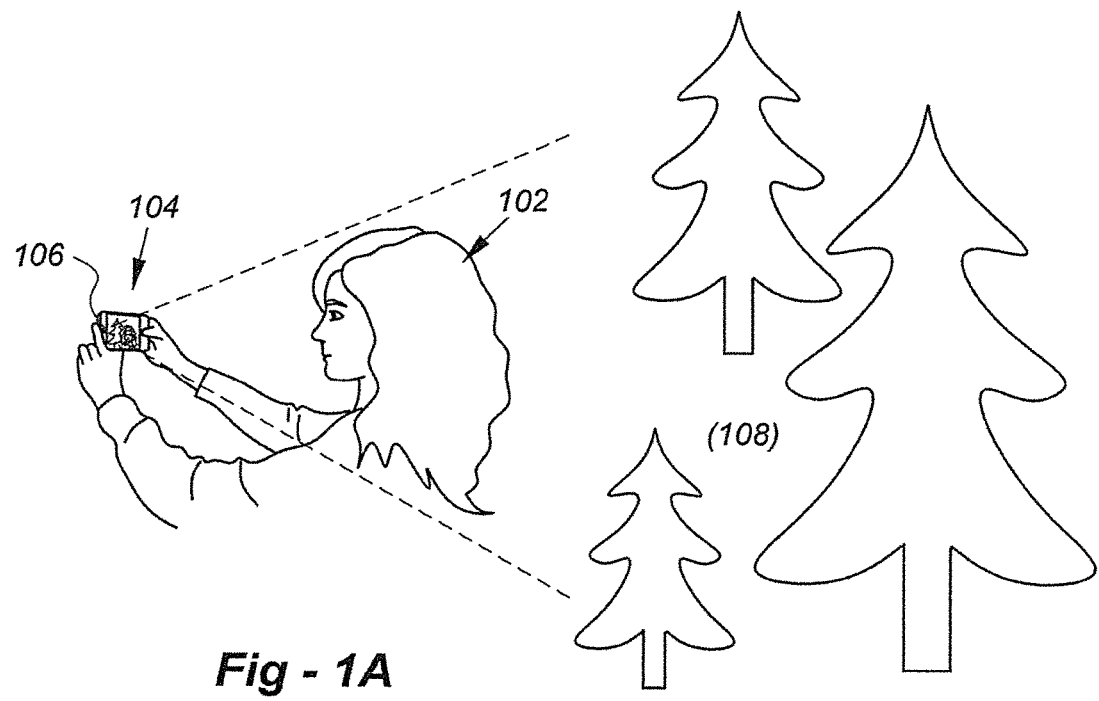
FIG. 1A is a drawing of a person using a prior art smartphone with camera to capture a self-shot or "selfie"
Figure 1B:
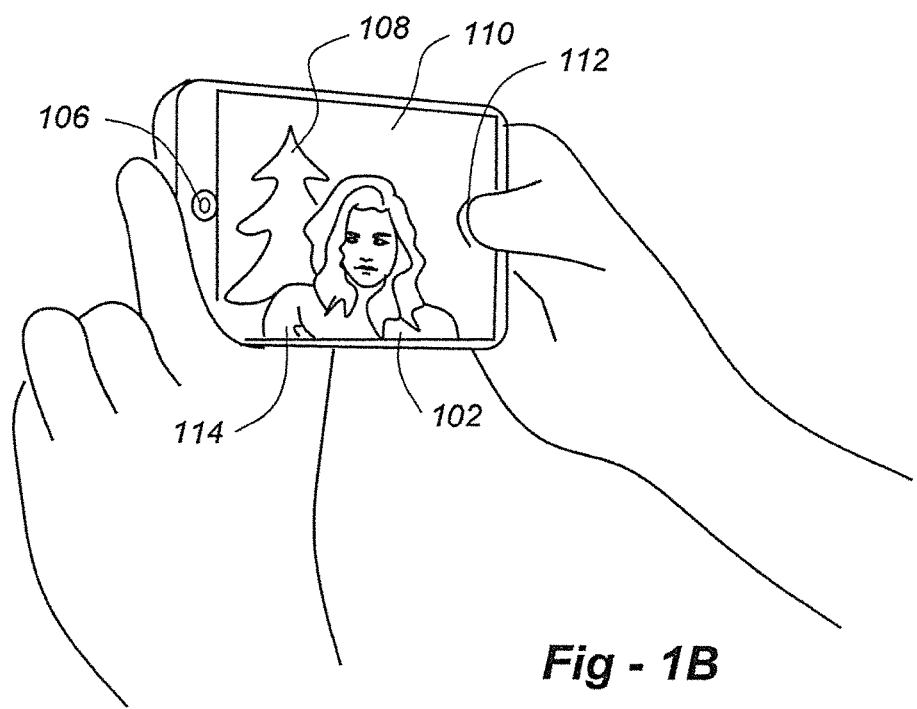
FIG. 1B shows the image taken with the smartphone of FIG. 1A.

This invention is broadly directed to mobile devices that have cameras, and wherein digital matting and compositing operations are carried out within the device itself In certain embodiments, images and/or video sequences are stored in layers, or with other information enabling matting or compositing operations to be carried out subsequent to picture/movie acquisition. Matting or compositing operations may be executed following intended foreground and background subject matter acquisition. In one preferred embodiment, matting and compositing are executed automatically with foreground and background subject matter being acquired with different cameras of the same device.

Existing portable electronic devices such as smartphones now have both forward- and rearward-looking cameras. Currently, only one of these cameras may be used at the same time, with a control on a touch screen typically being used to toggle between them. However, embodiments of this invention enable both the front and rear cameras to be used to place foreground objects into different or alternate background scenes. The invention is not limited devices with front and rear cameras, however, as the capabilities described herein may be used with devices having single cameras to capture foreground and background subject matter at different times. Nor is the invention limited to smartphones, as applicable digital cameras, tablet/pad computers and any other mobile device having a still or video camera(s) may alternatively be used.

Basic digital matting operations can be described mathematically using the expression:

$$I_z = \alpha_z F_z + (1-\alpha_z) B_z,$$

where F is the foreground image; B is the background image; and I is the finished, observed image. Depth is represented by z, and α is known as the alpha channel or alpha matte. Thus a composite image may be modelled as a combination of foreground and background images using the alpha matte. An alpha value of 1 means z is definitely part of the foreground, whereas a 0 means z is definitely part of the background. Otherwise, z is said to be mixed.

As with traditional film-based approaches, any additional information useful in differentiating foreground objects from background scenes has the potential for simplifying the matting equation. For example, digital matting would greatly benefit from chroma-keying, but it would come with the attendant drawbacks, not the least of which is the need for a uniformly colored background.

Accurate digital matting with natural backgrounds is a desirable goal and numerous approaches are being researched, tried and tested. Some involve human intervention or specialized hardware. If a user is able to outline desired foreground subject matter with a cursor or light pen, for example, it is relatively straightforward to cut and paste that subject matter into any desired background.

Approaches based upon camera distance have also been proposed. 3DV Systems, Ltd. (www.3dvsystems.com) uses a specialized camera to measure both color and depth information of a visible scene in real time. The resultant "depth key" assumes the space-coherence of scene objects, enabling them to be segmented according to different distances from the camera regardless of object colors or textures. The key can be generated without limitations on the keyed object background, including outside in natural surroundings, even if an object is similar to its background color. It is also possible to generate more than one matte, each being related to a different distance from the camera.

Figure 2A:
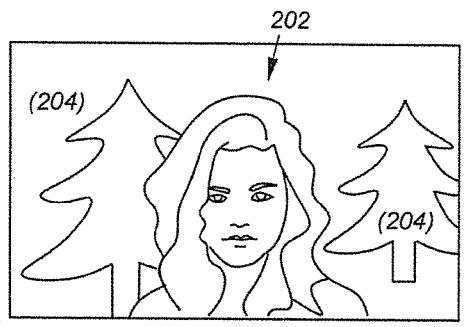
FIG. 2A is a drawing of a digital image including foreground subject matter against a background scene.
Figure 2B:
FIG. 2B depicts a three-level pixel map or trimap associated with the foreground subject matter of FIG. 2A.
Figure 2C:
FIG. 2C shows an alpha channel of the foreground subject matter of FIG. 2A using the trimap of FIG. 2B.
Figure 2D:
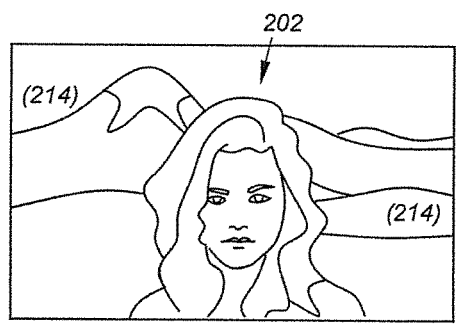
FIG. 2D is a drawing of a digital image including the foreground subject matter of FIG. 2A against a background scene other than the one shown in FIGS. 2A, B, using the alpha channel of FIG. 2C.

Most existing digital matting approaches segment an image into three regions: definitely foreground, definitely background, and unknown. FIG. 2A is a drawing of a digital image including foreground subject matter against a background scene. FIG. 2B depicts a three-level pixel map or trimap associated with the foreground subject matter of FIG. 2A. FIG. 2C shows an alpha channel of the foreground subject matter of FIG. 2A using the trimap of FIG. 2B. FIG. 2D is a drawing of a digital image including the foreground subject matter of FIG. 2A against a background scene other than the one shown in FIGS. 2A, B, using the alpha channel of FIG. 2C.

The use of a trimap reduces the matting problem to estimating F, B and α for pixels in the unknown region based upon known foreground and background pixels. The trimap may be manually specified by a user, or it may be generated through more generalized binary segmentation techniques. Perhaps needless to say, numerous digital segmentation and trimap generation algorithms are currently in development, many of which show promise for real-time, accurate matting with natural backgrounds. See *Image and Video Matting: A Survey*, by Jue Wang and Michael Cohen, incorporated herein by reference.

In accordance with the invention, when an image is captured, information may be generated for use in conjunction with matting and compositing operations. The information may be generated in response to a user input; however, in the preferred embodiments the information is generated automatically without operator intervention. If the image is stored, the information may be stored along with it. Any type of information useful in differentiating foreground and background subject matter may be used. For example, the image may be automatically segmented, with the information including a trimap generated using any known or yet-to-be-developed technique(s).

Various techniques may be used to assist in segmentation, trimap generation, outlining, or differentiation between foreground and background subject matter in general. For example, in using a handheld device such as a smartphone, the presence of jiggling may be used to identify the outlines of foreground subjects against background scenes, which tend to be more stationary. Autofocus and/or image stabilization algorithms may be used in conjunction with such outline generation. To further assist in this process, image acquisition may be delayed until a usable foreground object outline is determined, or the user may be asked or encouraged to jiggle the device prior to capture. As a further alternative, if the device has two or more cameras directed to the same or an overlapping field of view, foreground object edge detection may be achieved through stereoscopic comparison techniques.

Figure 3A:
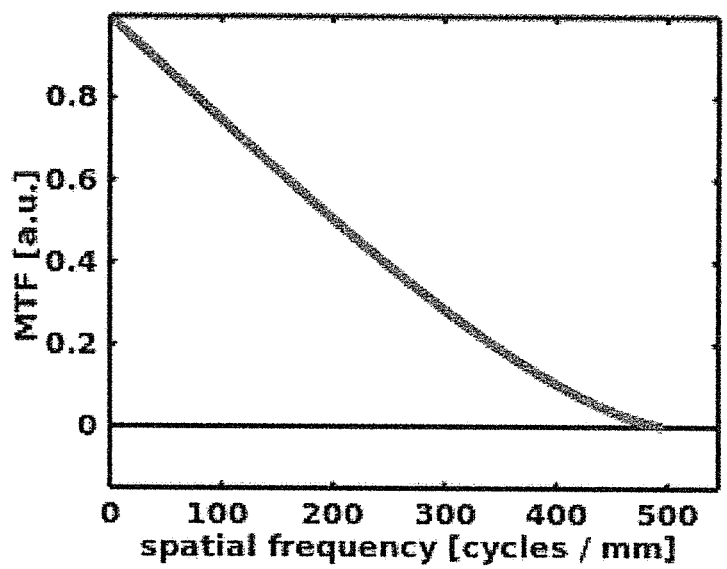
FIG. 3A graphs the the modulation transfer function (MTF) of a well-focused image.
Figure 3B:
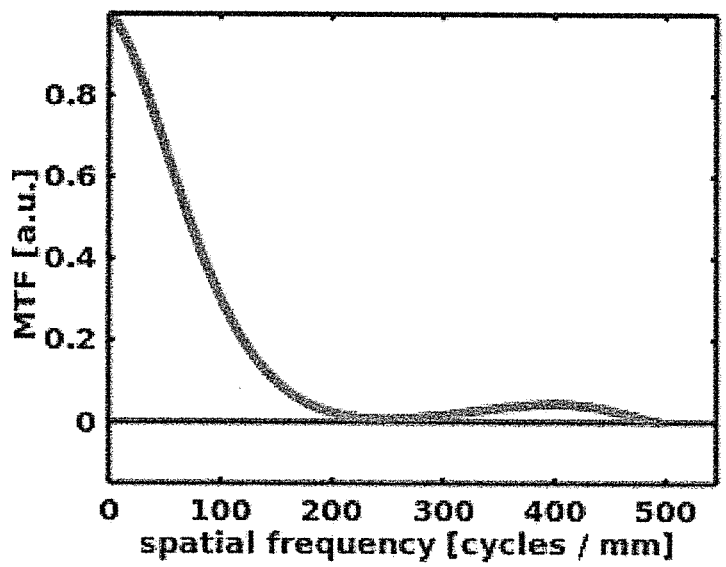
FIG. 3B is a graph that shows a lower spatial frequency for an out-of-focus image.

Distance, focus and/or depth of field/focus may also be used to differentiate between foreground and background subject matter for compositing purposes. In particular, using focus and/or depth of field, optical transfer functions may be used to identify in-focus foreground objects relative to fuzzy backgrounds. As shown in FIG. 3, the modulation transfer function (MTF) of a well-focused image (FIG. 3A) exhibits a higher spatial frequency as compared to an out-of-focus image (FIG. 3B). In accordance with the invention, autofocus may be used on foreground subject matter, preferably with a shallow depth of field, to image crisp foreground object(s) against a poorly focused background scene. The image may then be segmented and analyzed in terms of spatial frequency to generate an outline, trimap or other useful data.

If the user has already intentionally composed an image in which foreground subject matter is well-focused against a blurred background, focus-based algorithms may be expressly computed. However, if the user has not provided such an opportunity, the camera may "temporarily" focus on foreground subject matter to perform the segmentation operations prior to actual image acquisition. As a further aid, if the user is taking a "selfie" with a rear-facing camera in a selfie mode of operation such as those described below, the camera may assume the foreground subject is at an average arm's length from the camera; that is, in the range of 16 to 28 inches. Facial recognition software may also be used for foreground/background differentiation, not only in conjunction with focus-based algorithms (i.e., by using the bounding box around the face to determine the distance to the foreground subject matter), but also in conjunction with digital matting algorithms that benefit from bounding boxes.

Figure 4A:
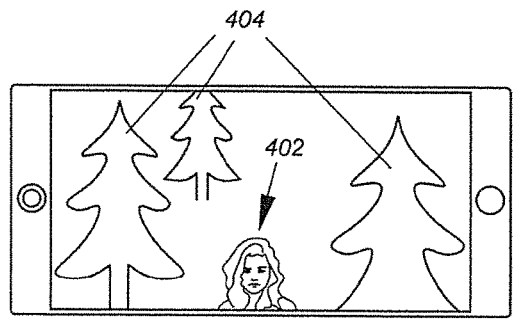
FIG. 4A shows an image captured along with information useful in digital matting, overlay and/or superposition.

Regardless of the technique used, if/when an image is stored with foreground/background keying information, different operations may be performed by a user to create composites. FIG. 4A shows an image captured along with information useful in digital matting, overlay and/or superposition. In some embodiments, such an image may be stored with foreground 402 and background 404 subject matter designated as layers, enabling commercially available or similar software such as Adobe Photoshop, Illustrator (or Premiere for Video) to be used for image manipulation.

Figure 4B:
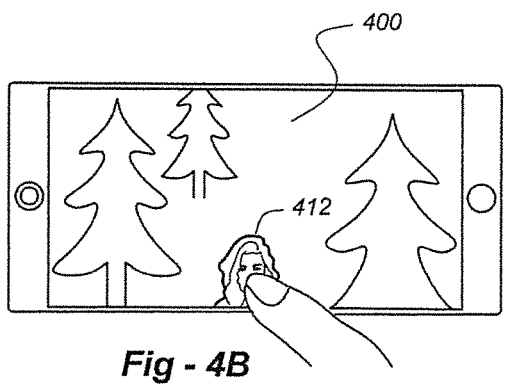
FIG. 4B illustrates that by tapping on the screen, the foreground subject matter may be selected, with a possible visually evident outline being included to assist with manipulations.
Figure 4C:
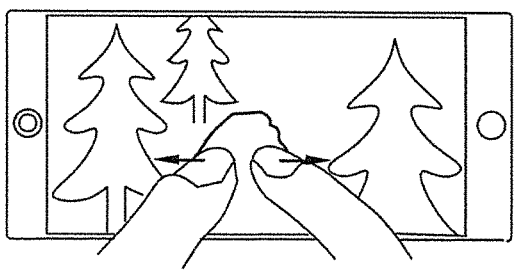
FIG. 4C, 4D illustrate foreground matter before and after enlargement.
Figure 4D:
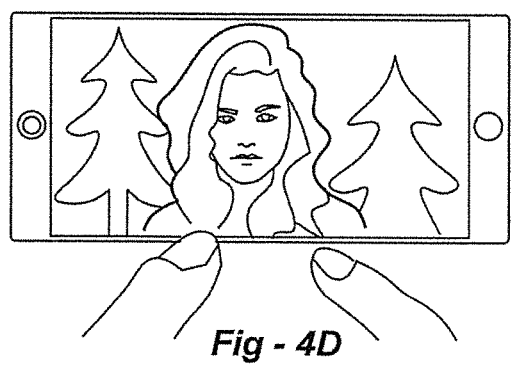
Figure 4E:
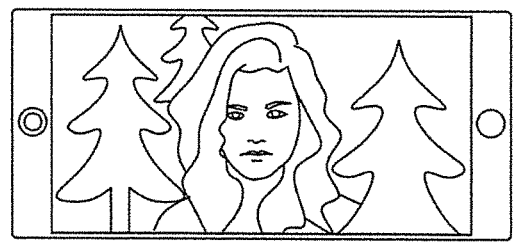
FIG. 4E shows the final composition without the temporary outline.
Figure 4F:
FIG. 4F shows how a user is able to select the item, then cut/copy and paste that item onto a different background.

The image of FIG. 4A would appear on the touch screen 410 of the portable device either immediately after the image was taken or upon retrieval from device memory. Possible operations are as follows. As shown in FIG. 4B, by tapping on the screen 410, the foreground subject matter may be selected, and a possible visually evident outline 412 may be included to assist with manipulations. If the same background is maintained, operations may be limited to enlargement (using two spreading fingertips, for example), and limited translation after enlargement, since reduction and excessive translation might reveal the alpha channel if certain digital matting operations were used. FIGS. 4C, 4D illustrate the foreground matter before and after enlargement. FIG. 4E shows the final composition after the temporary outline disappears. However, the user would preferably also be able to select the item, and cut/copy and paste onto a different background as shown in FIG. 4F.

If a foreground item is placed onto a different background, additional operations are available, including enhanced lateral x-y positioning and reduction as well as enlargement. Further, to enhance quality, manual or automatic operations may be performed to match the brightness, contrast, saturation or hue of the foreground selection to the background scene. More advanced operations include performing a mirror operation on the foreground object to ensure that text or facial features are right-reading, as well as automatic (or manual) operations to modify light source(s) so that foreground and background shadows are consistent. Such operations, available through software applications such as Photoshop®, would be apparent to those of skill in the art of digital image processing.

Figure 5:
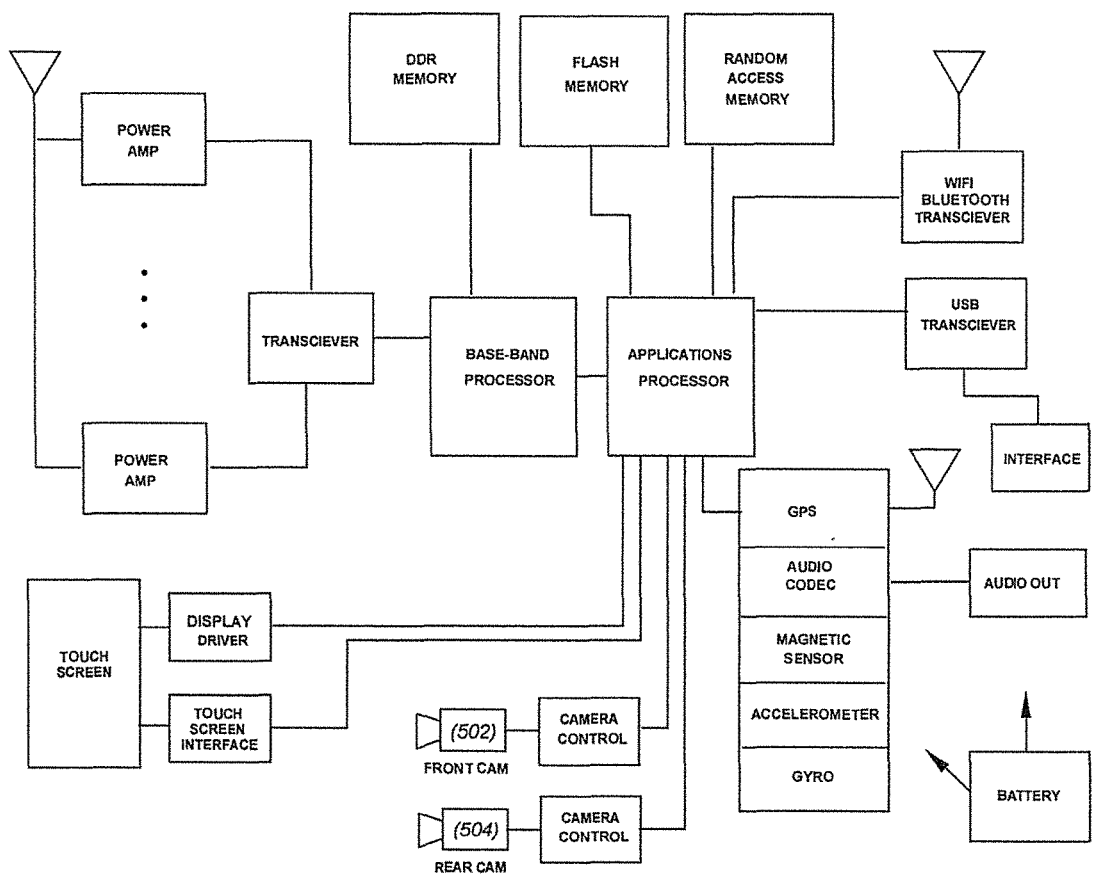
FIG. 5 is a block diagram of a portable or mobile electronic device such a smartphone with multiple cameras applicable to the invention.

The possibilities of the invention are particularly interesting given a mobile device with front and rear cameras. FIG. 5 is a block diagram of a mobile or portable electronic device to which the invention is applicable. An applications processor acts as a central controller, receiving inputs from a cellular communications subsystem, shorter-range wireless communications, audio processing, human interface, etc. While this diagram is representative of a typical smartphone, the invention is not limited to this particular system, in that more or fewer subsystems may be provided. For example, the invention is application to cameras without communications subsystems, as well as devices with fewer or more cameras, as might be used for stereoscopic viewing as described elsewhere herein.

Figure 6:
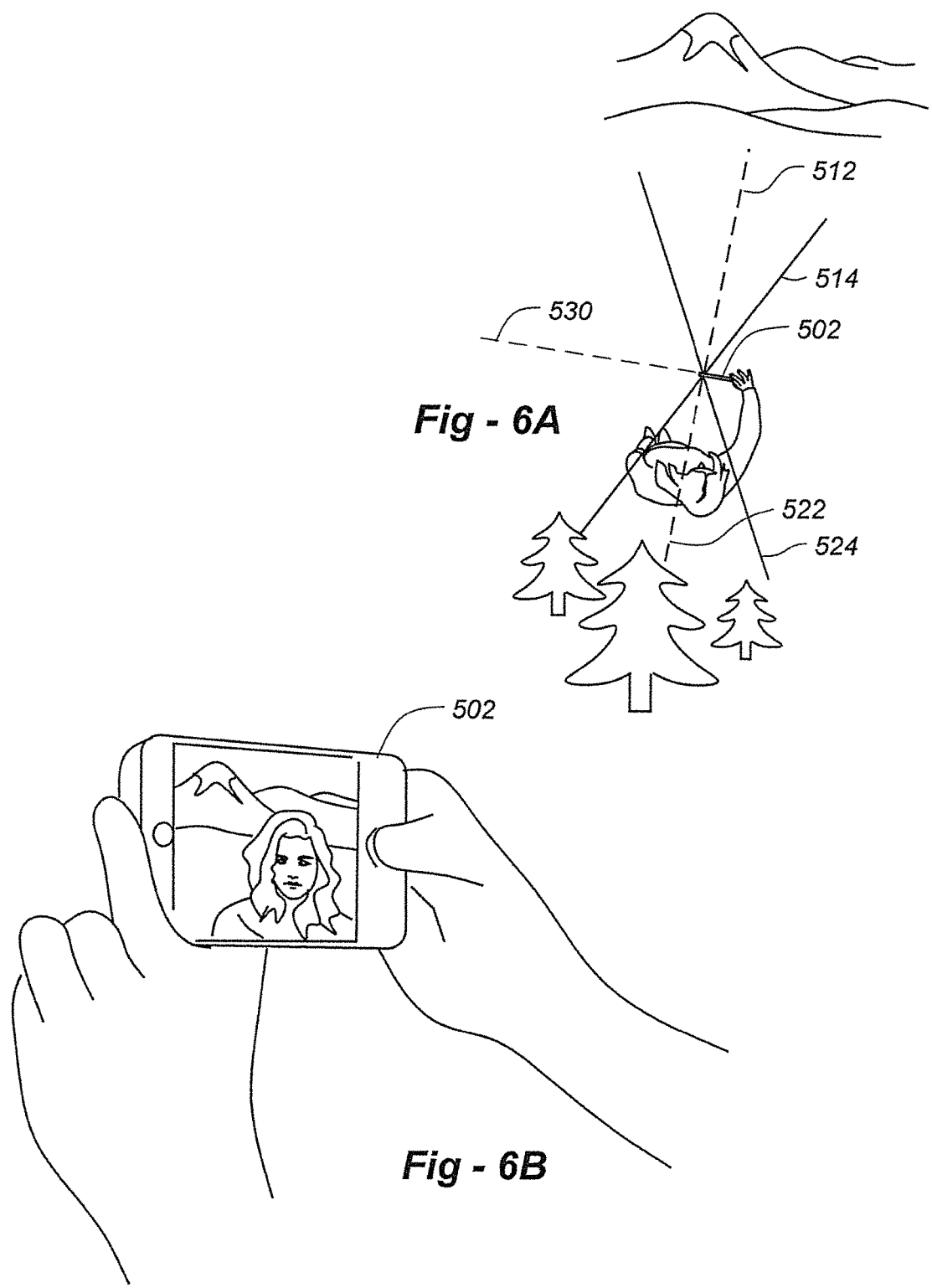
FIG. 6A is a top-down view of a portable device such as smartphone including front and rear cameras that captures background and foreground scenes, respectively.
FIG. 6B is a composite digital image captured with the device of FIG. 6A.

In FIG. 6A, a smartphone 502 of the type depicted in FIG. 5, captures background and foreground scenes, respectively, using front and rear cameras 502, 504. In a preferred embodiment, when the shutter is activated, the front and rear images are taken simultaneously. In the top-down view of FIG. 6A, forward camera has an optical axis 512 and a field of view 514. Rear camera 504, likewise, has an optical axis 522 and a field of view 524. While not essential to the invention, the optical axes 512, 522 may be parallel to one another and orthogonal to the plane 530 of the portable device 502, thereby taking pictures for composition in entirely opposite directions.

In this "selfie mode" made possible by the invention, the image of the operator captured with the rear-viewing camera is shown on the touch screen in superposition with the background scene captured with the forward-looking camera. Accomplishing this requires a high degree of digital image manipulation. In particular, the digital matting equation set forth above has been computed and satisfied insofar as the composite image has been modelled as a combination of foreground and background images using an alpha matte automatically generated by the mobile device. Any of the techniques described herein to assist in this process may be used, including methods associated with edge detection, outline identification or trimap generation. Any known or future matting algorithms may be used, including sampling-based (i.e., Bayesian, Knockout); affinity-based (i.e., Poisson, Random Walk, Closed-Form); or combinations thereof.

FIG. 6B shows the composite image on the screen of the device 502 prior to capture. Here, the foreground subject matter (in this case a portrait of the user) has been automatically extracted from the trees behind the user and placed into the background subject matter (mountains) seen by the forward-looking camera. With sufficient processing power, the foreground subject matter is automatically extracted in real time, enabling the user to compose the composite image prior to capture. That is, the user may move the device 502 to position the foreground subject relative to the background scene until a desired composition is achieved.

Given the composed image of FIG. 6B, now with foreground imagery conjoined with an unrelated background scene, the same types of operations depicted in FIG. 4 may be performed, either immediately after the composite image is taken, or after recall from memory. That is, the foreground subject matter may be repositioned, enlarged, reduced, corrected for luminance, or chrominance, adjusted of opacity or transparency, etc. In particular, the user may select the foreground subject and/or background scene prior to image capture, using touchscreen finger movements to adjust relative size and/or positioning. For example, by selecting the foreground subject matter, the user may use two spreading fingers to adjust the optical or digital zoom of the device to make the foreground subject matter (i.e., their selfie), appear larger (or smaller) against the background scene (i.e., by changing from wide angle to telephoto). Alternatively, by selecting the background subject matter, the user may use two spreading fingers to adjust the optical or digital zoom of the device to adjust the background scene from telephoto to wide angle. Any other x, y placement(s) and zoom (z) combinations are possible.

Figure 7:
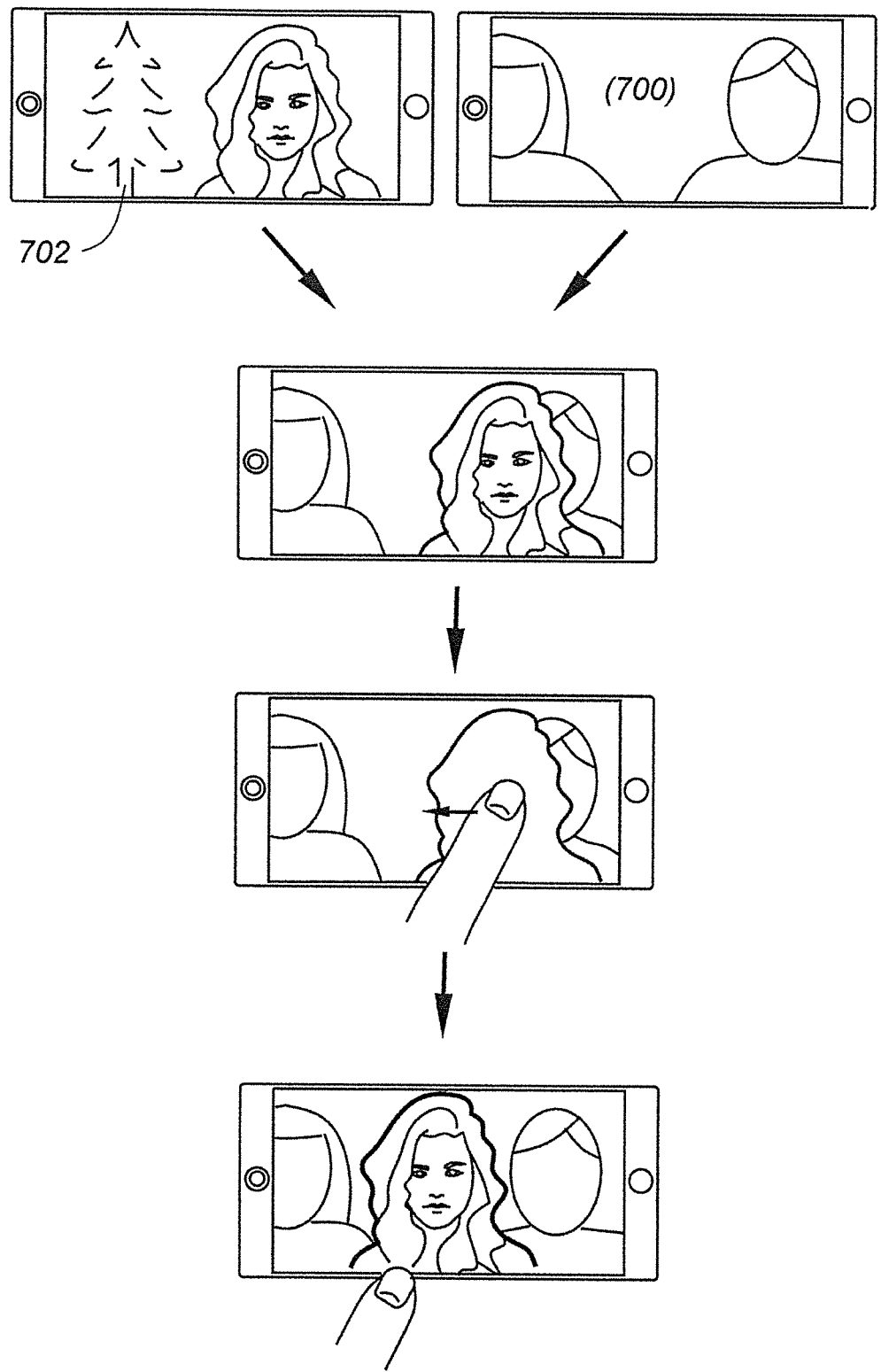
FIG. 7 illustrates a composite selfie that is acceptable in size but wherein placement is not optimal and adjusted.

In FIG. 7, a selfie is combined with a group shot 700 captured by the forward-looking camera of the device. The tree 702 in broken-line form illustrates the background from which the foreground portrait has been extracted by the invention. In this case, the selfie is acceptable in size but placement is not optimal. So the user is able to select the foreground image (either before or after the composite shot is taken) to move the selected image (with optional outline) in x-y to reposition as desired before storing (or re-storing).

Figure 8:
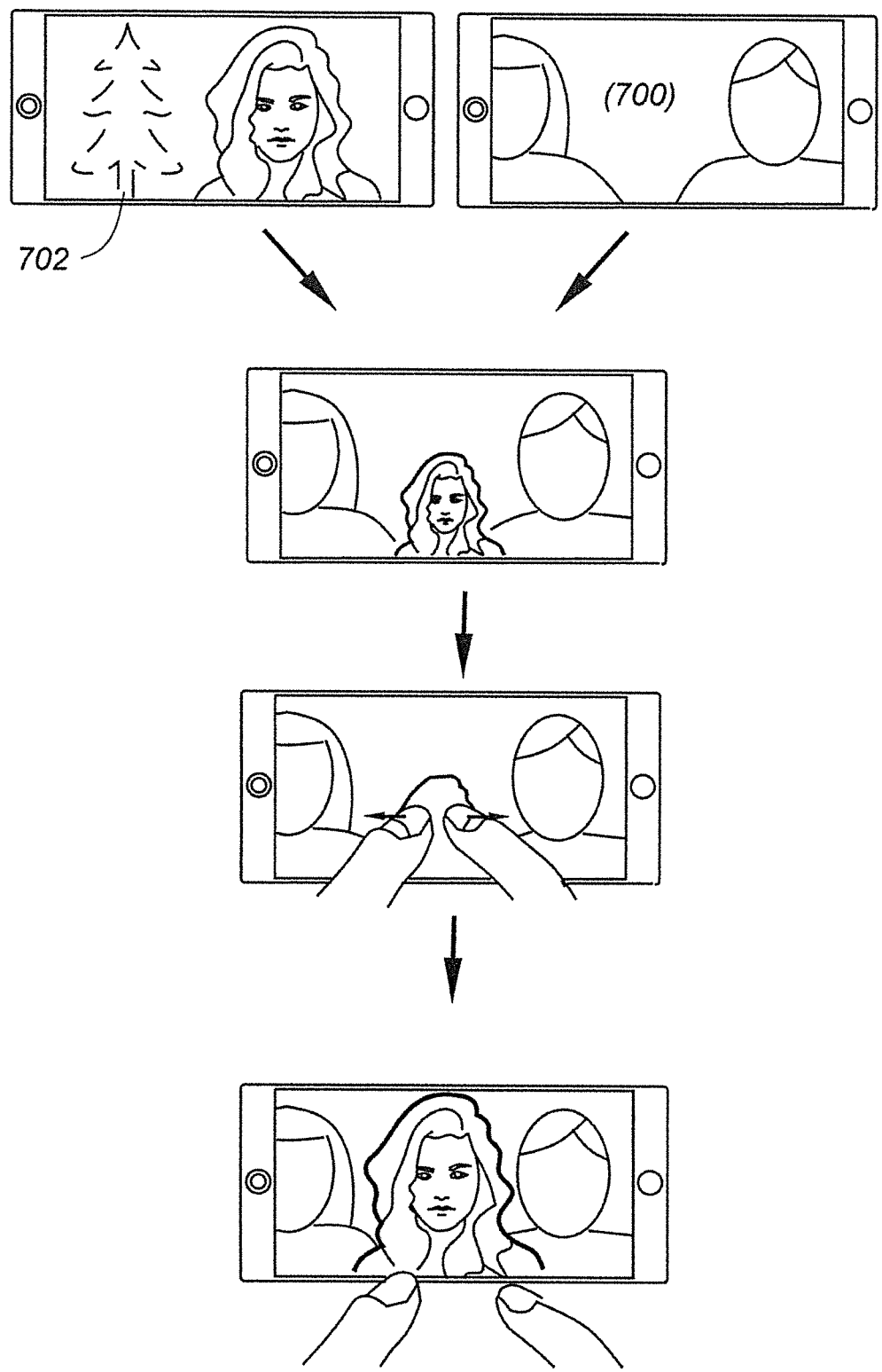
FIG. 8 illustrates a composite selfie that is acceptable in position but wherein size is not optimal and adjusted.

In FIG. 8, again selfie is combined with a group shot 700 captured by the forward-looking camera of the device. The tree 702 in broken-line form illustrates the background from which the foreground portrait has been extracted by the invention. In this case however, the selfie is acceptable in position but size is not optimal. So the user is able to select the foreground image (either before or after the composite shot is taken) to enlarge (or reduce) the selected image (with optional outline) as desired before storing (or re-storing).

While the embodiments herein have emphasized still image compositing, the invention is readily extended to combined still and video, as well as video-video compositions using the same camera at different times or different cameras at the same time in the same portable device. Most existing video matting approaches use a two-step approach involving high-quality binary segmentation to generate trimaps for video frames. After this step, image matting algorithms are applied to generate the final mattes. In the segmentation/trimap stages, various techniques have been employed including optical flow algorithms, digital 'rotoscoping,' graph-cut and geodesic optimization, all of which are applicable to the invention assuming computation capabilities now on the horizon for mobile/portable devices.

The invention claimed is:

1. An apparatus, comprising:
   a display;
   a first digital camera;
   a second digital camera;
   a memory; and
   a processor
      programmed to perform instructions to cause the apparatus to:
         acquire a first video of a user in front of background imagery using the first digital camera;
         perform an operation on the acquired first video to extract a second video of the user from the background imagery;
         acquire a new background scene;
         generate a composite video by inserting the second video of the user into the new background scene; and
         display the composite video on the display.

2. The apparatus of claim 1, wherein the processor is further programmed to cause the apparatus to perform a digital matting operation on the acquired first video to extract the second video of the user from the background imagery.

3. The apparatus of claim 2, wherein the processor is further programmed to cause the apparatus to store the acquired first video in the memory along with a trimap used by the digital matting operation to extract the second video of the user from the background imagery.

4. The apparatus of claim 1, wherein the operation performed on the acquired first video to extract a video of the user without the background imagery comprises finding an edge or an outline of the user.

5. The apparatus of claim 1, wherein the acquired first video and the acquired new background scene are stored as different graphical layers in the memory.

6. The apparatus of claim 1, further comprising a user control that enables a user to select, resize, or reposition the second video of the user relative to the acquired new background scene.

7. The apparatus of claim 1, wherein the acquired new background scene comprises a still image or video acquired by the second digital camera.

8. The apparatus of claim 7, wherein the acquired first video and the acquired new background scene are captured simultaneously.

9. The apparatus of claim 1, wherein the acquired new background scene comprises a previously-acquired image or previously-acquired video retrieved from the memory.

10. The apparatus of claim 1, wherein the display comprises a touchscreen display configured to enable a user to perform the following functions in conjunction with the processor:
   select the first video of the user; and
   superimpose the first video of the user onto the acquired new background scene.

11. The apparatus of claim 10, wherein the processor is further programmed to cause the apparatus to perform one or more of the following operations: adjust the zoom levels of one or both of the cameras; adjust the size or position of the video of the user relative to the new background scene; and adjust the luminance or chrominance levels of the video of the user relative to the acquired new background scene.

12. A method comprising:
   acquiring a first video of a user in front of background imagery using a first digital camera of a first electronic device;
   performing an operation on the acquired first video to create a second video of the user that excludes the background imagery;
   acquiring a third representation of a scene using a second digital camera of the first electronic device;
   generating a composite video by inserting the second video of the user into the third representation of the scene acquired by the second digital camera; and
   displaying the composite video on a display of the electronic device.

13. The method of claim 12, further comprising: using an alpha mask to insert the first video of the user into the scene.

14. The method of claim 12, wherein the fields of view of the first and second digital cameras are oriented in substantially opposing directions.

15. The method of claim 12, wherein the first video of the user in front of background imagery and the third representation of the scene are acquired simultaneously.

16. The method of claim 12, wherein the third representation of the scene comprises a video.

17. The method of claim 12, further comprising: storing the composite video in a memory.

18. The method of claim 12, further comprising: transmitting the composite video to a remote location using a transceiver.

19. The method of claim 12, further comprising:
   storing the second video of the user in a memory; and
   retrieving the second video of the user from the memory so that it may be inserted into the third representation of the scene.

20. The method of claim 12, further comprising: storing the first video of the user in front of the background imagery and the third representation of the scene as separate graphical layers in a memory.

21. The method of claim 12, wherein performing an operation on the acquired first video comprises receiving user input at the first electronic device.

22. The method of claim 12, wherein the display comprises a touch-screen display, and the method further comprises:
   displaying the acquired first video of the user in front of background imagery on the touch-screen display; and
   reducing, enlarging, or repositioning the user relative to the background imagery using the touch-screen display.

23. The method of claim 12, wherein the second video of the user is automatically extracted from the acquired first video of the user in front of background imagery based, at least in part, upon a distance of the user from the first electronic device.

24. The method of claim 23, wherein the distance of the user from the first electronic device is determined based, at least in part, upon one or more of the following:
   a predetermined value, facial recognition, focus, depth of field, an optical transfer function, and spatial frequency.

* * * * *